United States Patent
Yoshihiro et al.

(10) Patent No.: US 8,378,005 B2
(45) Date of Patent: Feb. 19, 2013

(54) ACTIVE ENERGY RAY-CURABLE INKJET INK COMPOSITION

(75) Inventors: Yasuo Yoshihiro, Tokyo (JP); Yukitoshi Takahashi, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 381 days.

(21) Appl. No.: 12/279,775

(22) PCT Filed: Feb. 16, 2007

(86) PCT No.: PCT/JP2007/052819
§ 371 (c)(1),
(2), (4) Date: Aug. 18, 2008

(87) PCT Pub. No.: WO2007/094446
PCT Pub. Date: Aug. 23, 2007

(65) Prior Publication Data
US 2009/0053484 A1 Feb. 26, 2009

(30) Foreign Application Priority Data
Feb. 17, 2006 (JP) .................................. 2006-040407

(51) Int. Cl.
*C09D 11/00* (2006.01)
(52) U.S. Cl. ........... 523/160; 523/161; 428/195.1; 526/259; 522/152
(58) Field of Classification Search ............... 523/160, 523/161
See application file for complete search history.

(56) References Cited

U.S. PATENT DOCUMENTS

| | | | |
|---|---|---|---|
| 6,730,763 B1 * | 5/2004 | Okazaki et al. | 526/262 |
| 6,913,352 B2 | 7/2005 | Yoshihiro et al. | |
| 2002/0028302 A1 * | 3/2002 | Okazaki et al. | 427/487 |
| 2004/0146804 A1 * | 7/2004 | Shiraishi | 430/270.1 |
| 2005/0171227 A1 * | 8/2005 | Weine Ramsey | 522/1 |
| 2009/0012198 A1 * | 1/2009 | Araumi et al. | 522/35 |
| 2009/0130405 A1 * | 5/2009 | Kumagai et al. | 428/201 |

FOREIGN PATENT DOCUMENTS

| | | | |
|---|---|---|---|
| JP | 5 214280 | | 8/1993 |
| JP | 06-184484 | * | 7/1994 |
| JP | 9 183929 | | 7/1997 |
| JP | 2000-234045 | * | 8/2000 |
| JP | 2000 327724 | | 11/2000 |
| JP | 2002 116538 | | 4/2002 |
| JP | 2002 167537 | | 6/2002 |
| JP | 2003 55602 | | 2/2003 |
| JP | 2004 175906 | | 6/2004 |
| JP | 2004 518787 | | 6/2004 |
| JP | 2004 182808 | | 7/2004 |
| JP | 3619778 | | 11/2004 |
| WO | WO 02/38688 | * | 5/2002 |
| WO | WO 2004/050731 | * | 6/2004 |
| WO | WO 2005/026270 | * | 3/2005 |

OTHER PUBLICATIONS

Machine translation of JP 06-184484.*
Machine translation of JP 2000-234045.*
Kumagai et al, WO 2006/106821, Mar. 2006.*
U.S. Appl. No. 12/093,338, filed May 12, 2008, Takahashi, et al.
U.S. Appl. No. 12/093,242, filed May 9, 2008, Nishida, et al.
U.S. Appl. No. 11/995,004, filed Jan. 8, 2008, Jonai, et al.
Office Action issued May 22, 2012 in Japanese Application No. 2008-500559 (With Partial English Translation).
Office Action issued Oct. 31, 2012 in Taiwanese Application No. 096106009 (with English-language Translation).

\* cited by examiner

*Primary Examiner* — Doris Lee
(74) *Attorney, Agent, or Firm* — Oblon, Spivak, McClelland, Maier & Neustadt, L.L.P.

(57) ABSTRACT

Provided is an active energy ray-curable inkjet ink comprising a pigment and polymerizable monomers that is superior in nozzle ejection stability, adhesiveness to recording medium and storage stability, wherein the polymerizable monomers comprise N-acryloyloxyethyl hexahydrophthalimide.

18 Claims, No Drawings

ACTIVE ENERGY RAY-CURABLE INKJET INK COMPOSITION

TECHNICAL FIELD

The present invention relates to an active energy ray-curable inkjet ink and a printing which is obtainable by curing the ink.

BACKGROUND ART

Conventionally, as favorable water-resistant inkjet inks, inkjet inks of an oil soluble dyestuff dispersed or dissolved in a high-boiling solvent and those of an oil soluble dyestuff dissolved in a volatile solvent have been known. However, dyes are inferior in stability such as light stability comparing to pigments. Therefore, there was a demand for an ink containing a pigment as the colorant. However, it was difficult to stably disperse a pigment in an organic solvent and to assure stable dispersion and ejection. On the other hand, it was difficult to dry inks containing a high-boiling solvent by vaporization because the solvent is less volatile, and thus, such an ink could not be printed on a non-absorptive substrate.

An ink containing a volatile organic solvent can be favorably printed on a non-absorptive substrate, depending on the adhesiveness of the resin and the volatility of the solvent. However, the head nozzle face was dried very quickly due to the vaporization of the solvent, which requires frequent maintenance. In addition, an ink should be re-dissolved in solvent, and thus, the solvent resistance of the printing was insufficient in some cases.

In order to satisfy the above properties, inks containing non-volatile monomers that prevent the head from drying and are cured by irradiation of an active-energy ray were also used. Such active energy ray-curable inkjet inks are disclosed in Patent Documents 1 to 7, but none of the inks were practical enough, from the points of substrate adhesiveness, pigment dispersion, ejection stability, and storage stability.

Patent Document 1: Japanese Patent Application Laid-Open No. 5-214280
Patent Document 2: Japanese Patent Application Laid-Open No. 9-183929
Patent Document 3: Japanese Patent Application Laid-Open No. 2002-167537
Patent Document 4: Japanese Patent Application Laid-Open No. 2004-518787
Patent Document 5: Japanese Patent No. 3619778
Patent Document 6: Japanese Patent Application Laid-Open No. 2004-175906
Patent Document 7: Japanese Patent Application Laid-Open No. 2004-182808

SUMMARY OF THE INVENTION

Problems to be Solved by the Invention

An object of the present invention is to provide an active energy ray-curable inkjet ink superior in nozzle ejection stability, adhesiveness to recording medium and storage stability.

Means for Solving the Problems

An aspect of the present invention relates to an active energy ray-curable inkjet ink comprising polymerizable monomers which comprise N-acryloyloxyethyl hexahydrophthalimide.

The content of N-acryloyloxyethyl hexahydrophthalimide may be 1 to 30% by weight with respect to the total amount of the polymerizable monomers. The ink may further comprise a photopolymerization initiator. The content of the photopolymerization initiator may be 2 to 20% by weight with respect to the entire amount of the ink.

Further, the polymerizable monomers may comprise 2-phenoxyethyl acrylate in an amount of 30 to 90% by weight with respect to the total amount of the polymerizable monomers. Further, the polymerizable monomers may comprise N-vinyl-2-caprolactam in an amount of 5 to 30% by weight with respect to the total amount of the polymerizable monomers.

Another aspect of the present invention relates to a printing, which is obtainable by forming an image on a substrate with the active energy ray-curable inkjet ink and curing the ink by irradiation of active energy ray.

The present disclosure relates to subject matter contained in Japanese Patent Application No. 2006-040407 filed on Feb. 17, 2006, the disclosure of which is expressly incorporated herein by reference in its entirety.

Effects of the Invention

According to one aspect of the present invention, provided is an active energy ray-curable inkjet ink superior in nozzle ejection stability, adhesiveness to recording medium, and storage stability.

BEST MODE FOR CARRYING OUT THE INVENTION

The ink according to the present invention is a liquid to be printed or applied on a substrate surface. The ink may comprise a colorant component, a filler and a resin component, according to its application.

Inks without a colorant component can be used in coating applications. Inks with a colorant component can be used in image formation and coating applications. When used in coating applications, the ink may be applied as a single coating layer or as a laminate coating layer with another layer described below. Various fillers and resin components may be added to the ink, for providing the cured film with favorable durability including rigidity and scratchability, molding workability, and controlling gloss. Examples of the fillers include, but are not limited to, extender pigments such as calcium carbonate, barium sulfate, spherical silica and hollow silica; resin beads and the like. The resin component is not particularly limited, if it is a resin inactive to the active energy ray, and examples thereof include polyurethane resins, vinyl chloride resins (e.g., polyvinyl chloride resin, vinyl chloride-vinyl acetate copolymers, and ethylene-vinyl acetate copolymers), polyester resins, poly(meth)acrylic resins, polyketone resins, polyvinyl resins (e.g., polyvinylacetal resins, polyvinylbutyral resins, and polyvinylpyrrolidone resins), cellulosic resins (e.g., CAB resins and CAP resins), and the like. The kinds and the blending rates of these fillers and resin components, if added, are preferably decided by taking into consideration the compatibility with inkjet printing. The ink according to the present invention may be used in image formation or coating, for example, by any other printing method such as silk screen printing, gravure printing, offset printing, or spray coating. When the ink according to the present invention is used for laminate coating with another layer, a coating agent that is used in general printing applications such as silk screen printing, gravure printing and offset printing may be laminated on the layer of the ink according to the present invention, a coat layer (such as film) formed separately may be laminated by transfer or with a spray coating agent or the like.

If the ink according to the present invention contains a colorant component, it can be used as a material for displaying graphic image, character, photograph and the like. Various dyes and pigments have been used as such colorant components, but in particular, pigments are used more frequently from the point of weather resistance.

The pigment for use may be an inorganic or organic pigment. Specific examples of the inorganic pigments include, but are not limited to, a chromatic pigments such as carbon black, titanium oxide and calcium carbonate, and the like. Examples of the organic pigments include, but are not limited to, insoluble azo pigments such as toluidine red, toluidine maroon, hansa yellow, benzidine yellow, and pyrazolone red; soluble azo pigments such as lithol red, helio bordeaux, pigment scarlet, and permanent red 2B; vat dye derivatives such as alizarin, indanthron, and thioindigo maroon; phthalocyanine-based organic pigments such as phthalocyanine blue and phthalocyanine green; quinacridone-based organic pigments such as quinacridone red and quinacridone magenta; perylene-based organic pigments such as perylene red and perylene scarlet; isoindolinone-based organic pigments such as isoindolinone yellow and isoindolinone orange; pyranthrone-based organic pigments such as pyranthrone red and pyranthrone orange; thioindigo-based organic pigments, condensed azo-based organic pigments, benzimidazolone-based organic pigments, quinophtharone-based organic pigments such as quinophtharone yellow; isoindoline-based organic pigment such as isoindoline yellow; other pigments such as flavanthrone yellow, acyl amide yellow, nickel azo yellow, copper azomethine yellow, perynone orange, anthrone orange, dianthraquinonyl red, dioxazine violet; and the like.

Examples of the organic pigments, as expressed by color index (C.I.), include, but are not limited to, C.I. Pigment Yellows 12, 13, 14, 17, 20, 24, 74, 83, 86, 93, 109, 110, 117, 120, 125, 128, 129, 137, 138, 139, 147, 148, 150, 151, 153, 154, 155, 166, 168, 180 and 185, C.I. Pigment Oranges 16, 36, 43, 51, 55, 59 and 61, C.I. Pigment Reds 9, 48, 49, 52, 53, 57, 97, 122, 123, 149, 168, 177, 180, 192, 202, 206, 215, 216, 217, 220, 223, 224, 226, 227, 228, 238 and 240, C.I. Pigment Violets 19, 23, 29, 30, 37, 40 and 50, C.I. Pigment Blues 15, 15:1, 15:3, 15:4, 15:6, 22, 60, and 64, C.I. Pigment Greens 7 and 36, C.I. Pigment Browns 23, 25 and 26, and the like.

Specific examples of the carbon blacks include, but are not limited to, "Special Black 350, 250, 100, 550, 5, 4, 4A and 6" and "Printex U, V, 140U, 140V, 95, 90, 85, 80, 75, 55, 45, 40, P, 60, L6, L, 300, 30, 3, 35, 25, A and G" manufactured by Degussa AG; "REGAL 400R, 660R, 330R and 250R" and "MOGUL E and L" manufactured by Cabot; "MA 7, 8, 11, 77, 100, 100R, 100S, 220, and 230", and "#2700, #2650, #2600, #200, #2350, #2300, #2200, #1000, #990, #980, #970, #960, #950, #900, #850, #750, #650, #52, #50, #47, #45, #45L, #44, #40, #33, #332, #30, #25, #20, #10, #5, #CF9, #95 and #260" manufactured by Mitsubishi Chemical Corp.; and the like.

Specific examples of the titanium oxides include, but are not limited to, "Tipaque CR-50, 50-2, 57, 80, 90, 93, 95, 953, 97, 60, 60-2, 63, 67, 58, 58-2, and 85", "Tipaque R-820, 830, 930, 550, 630, 680, 670, 580, 780, 780-2, 850 and 855", "Tipaque A-100 and 220", "Tipaque W-10", "Tipaque PF-740 and 744", "TTO-55 (A), 55(B), 55(C), 55(D), 55(S), 55(N), 51(A) and 51(C)", "TTO S-1 and 2", and "TTO M-1 and 2" manufactured by Ishihara Sangyo Kaisha, Ltd.; "Titanix JR-301, 403, 405, 600A, 605, 600E, 603, 805, 806, 701, 800 and 808" and "Titanix JA-1, C, 3, 4 and 5" manufactured by Tayca Corporation; "Ti-Pure R-900, 902, 960, 706 and 931" manufactured by E.I. duPont de Nemours and Company; and the like.

Among the pigments above, quinacridone-based, phthalocyanine-based, benzimidazolone-based, isoindolinone-based, condensed azo-based, quinophtharone-based, isoindoline-based and other organic pigments are preferable because of their excellent light stability. The average diameter of the pigment, as determined by laser scattering, is preferably 10 to 150 nm. Pigments having an average diameter of 10 nm or more are superior in light stability, and those having a diameter of 150 nm or less are resistant to sedimentation and thus give a more stabilized dispersion.

The organic pigment can be finely pulverized in the following manner: A clay-like mixture containing at least three components, that is, an organic pigment, a water-soluble inorganic salt in an amount of three times larger than that of the organic pigment and a water-soluble solvent, is kneaded vigorously for example in a kneader for pulverization, and the mixture is then poured into water, and the mixture is converted into slurry by agitation, for example, with a high-speed mixer. The slurry is then filtered and washed with water repeatedly, to remove the water-soluble inorganic salt and solvent. In the fine pulverization process, resins, pigment dispersants and others may be added.

Examples of the water-soluble inorganic salts include, but are not limited to, sodium chloride, potassium chloride and the like. These inorganic salts are used in an amount in the range of 3 times or more and preferably 20 times or less by weight of that of the organic pigment. An inorganic salt amount of 3 times or more by weight leads to production of a processed pigment with a desired size. In addition, an amount of 20 times or less by weight makes the water-washing processing easier in the following step, leading to practical increase in the efficiency of organic pigment processing.

The water-soluble solvent is used for forming a clay state of the mixture with the organic pigment and a pulverization aid water-soluble inorganic salt that is suitable for efficient and thorough pulverization. The water-soluble solvent is not particularly limited, if it is a solvent soluble in water, but high-boiling point solvents having a boiling point of 120 to 250° C. are preferable from the point of stability, because the solvents are heated and become easily vaporized during pulverization. Examples of the water-soluble solvents include, but are not limited to, 2-(methoxymethoxy)ethanol, 2-butoxyethanol, 2-(isopentyloxy)ethanol, 2-(hexyloxy)ethanol, diethylene glycol, diethylene glycol monomethylether, diethylene glycol monoethylether, diethylene glycol monobutylether, triethylene glycol, triethylene glycol monomethylether, liquid polyethylene glycol, 1-methoxy-2-propanol, 1-ethoxy-2-propanol, dipropyleneglycol, dipropylene glycol monomethylether, dipropylene glycol monoethylether, low-molecular weight polypropylene glycol and the like.

The content of the pigment in the entire ink of the present invention is 0.2 wt part to 15 parts by weight with respect to 100 parts by weight of the ink in the case of an organic pigment, and preferably 1 wt part to 40 parts by weight, more preferably 5 parts by weight to 40 parts by weight in the case of an inorganic pigment.

In the present invention, a polymer dispersant is preferably added to improve the storage stability of the pigment dispersion and the ink. Examples of the polymer dispersants for use include, but are not limited to, hydroxyl group-containing polycarboxylic esters, salts of a long chain polyaminoamide with a high-molecular weight acid ester, high-molecular weight polycarboxylic acid salts, salts of a long-chain polyaminoamide with a polar acid ester, high-molecularweight unsaturated acid esters, copolymers, modified polyurethanes, modified polyacrylates, polyether ester-type anionic activators, naphthalenesulfonic acid/formalin condensate salts, aromatic sulfonic acid/formalin condensate salts, polyoxyethylene alkylphosphoric esters, polyoxyethylene nonylphenylether, stearylamine acetate, condensates or salts of a polyallylamine with a polyester having free carboxylic acid groups, poly(ethyleneimine)-poly(12-hydroxystearic acid) graft polymers, and the like.

Specific examples of the polymer dispersants include, but are not limited to, "Anti-Terra-U (polyaminoamide phosphoric salt)", "Anti-Terra 203/204 (high-molecular-weight polycarboxylate salt)", "Disperbyk 101 (polyaminoamide phosphate salt and acid ester), 107 (hydroxyl group-containing carboxylate ester), 110 and 111 (acid group-containing copolymers), 130 (polyamide), 161, 162, 163, 164, 165, 166, 168 and 170 (copolymers), 180", and "400"; "Bykumen (high-molecular weight unsaturated acid ester)", "BYK P104 and P105 (high-molecular weight unsaturated acid polycarboxylic acid)", and "BYK-P104S and 240S (high-molecular weight unsaturated acid polycarboxylic acid and silicone)"; and "Lactimon (long-chain amine, unsaturated acid polycarboxylic acid and silicone)" manufactured by BYK Chemie;

"Efka 44, 46, 47, 48, 49, 54, 63, 64, 65, 66, 71, 701, and 766", and "Efka polymer 100 (modified polyacrylate), (aliphatic modified polymer), 400, 401, 402, 403, 450, 451, 452, 453 (modified polyacrylates), and 745 (copper phthalocyanine-based)", manufactured by Efka CHEMICALS; "Florene TG-710 (urethane oligomer)", "Flonone SH-290 and SP-1000", and "Polyflo No. 50E and No. 300 (acrylic copolymers)", manufactured by Kyoeisha Chemical; "Disperone KS-860, 873SN and (polymer dispersants), #2150 (aliphatic polyvalent carboxylic acid), and #7004 (polyetherester type)" manufactured by Kusumoto Chemicals, Ltd.;

"Demol RN and N (formalin naphthalenesulfonate condensate sodium salts), MS, C, and SN-B (aromatic formalin sulfonate condensate sodium salts), and EP", "Homogenol L-18 (polycarboxylic polymer)", "Emulgen 920, 930, 931, 935, 950 and (polyoxyethylene nonylphenylethers)", "Acetamin 24 (coconut amine acetate), and 86 (stearylamine acetate)", manufactured by Kao Corporation; "Solsperse" 5000 (quinacridonesulfonic acid ammonium salt), 13940 (polyester amine-based), 17000 (aliphatic amine-based), 22000 (Benzidine Yellow sulfonic acid ammonium salt), 24000GR, 32000, 33000, 39000, 41000, and 530000", manufactured by Lubrizol; "Nikkol T106 (polyoxyethylene sorbitan monooleate), MYS-IEX (polyoxyethylene monostearate), and Hexagline 4-0 (hexaglyceryl tetraoleate)" manufactured by Nikko Pharmaceutical; "Ajisper PB821, 822 and 824" manufactured by Ajinomoto Fine-Techno; and the like.

The dispersant is preferably contained in the ink at a concentration of 0.1 to 10% by weight.

N-acryloyloxyethyl hexahydrophthalimide used in the inkjet ink according to the present invention is superior in photopolymerization efficiency, curing efficiency and adhesiveness to the substrate, and dissolves other components in the ink such as prepolymer, pigment dispersant and photopolymerization initiator and thus disperse the pigment efficiently, and for that reason, N-acryloyloxyethyl hexahydrophthalimide is preferably contained in the inkjet ink in an amount of 1 to 30% by weight. When N-acryloyloxyethyl hexahydrophthalimide is contained at a concentration of 30% by weight or less in the inkjet, the viscosity of the ink is favorable. In addition, an inkjet ink containing the N-acryloyloxyethyl hexahydrophthalimide at 1% by weight or more is superior in adhesiveness to the substrate.

Examples of the polymerizable monomers used in the present invention other than the N-acryloyloxyethyl hexahydrophthalimide include, but are not limited to, ethylene glycol di(meth)acrylate, diethylene glycol di(meth)acrylate, polyethylene glycol di(meth)acrylate, 1,6-hexanediol di(meth)acrylate, ethoxylated 1,6-hexanediol diacrylate, neopentylglycol di(meth)acrylate, ethoxylated neopentylglycol di(meth)acrylate, propoxylated neopentylglycol di(meth)acrylate, tripropylene glycol di(meth)acrylate, polypropylene glycol diacrylate, 1,4-butanediol di(meth)acrylate, 1,9-nonanediol diacrylate, tetraethylene glycol diacrylate, 2-n-butyl-2-ethyl-1,3-propanediol diacrylate, dimethyloltricyclodecane diacrylate, neopentylglycol hydroxypivalate diacrylate, 1,3-butylene glycol di(meth)acrylate, ethoxylated bisphenol A di(meth)acrylate, propoxylated bisphenol A di(meth)acrylate, cyclohexanedimethanol di(meth)acrylate, dimethyloldicyclopentane diacrylate, trimethylolpropane triacrylate, hydroxypivalatotrimethylolpropane triacrylate, ethoxylated trimethylolpropane triacrylate, propoxylated trimethylolpropane triacrylate, ethoxylated phosphoric triacrylate, ethoxylated tripropylene glycol diacrylate, neopentylglycol-modified trimethylolpropane diacrylate, stearic acid-modified pentaerythritol diacrylate, pentaerythritol triacrylate, tetramethylolpropane triacrylate, tetramethylolmethane triacrylate, pentaerythritol tetraacrylate, caprolactone-modified trimethylolpropane triacrylate, ethoxylated isocyanuric triacrylate, tri(2-hydroxyethylisocyanurate) triacrylate, propoxylatoglyceryl triacrylate, tetramethylolmethane tetraacrylate, pentaerythritol tetraacrylate, ditrimethylolpropane tetraacrylate, ethoxylated pentaerythritol tetraacrylate, dipentaerythritol hexaacrylate, caprolactone-modified dipentaerythritol hexaacrylate, dipentaerythritol hydroxypentaacrylate, neopentylglycol oligoacrylate, 1,4-butanediol oligoacrylate, 1,6-hexanediol oligoacrylate, trimethylolpropane oligoacrylate, pentaerythritol oligoacrylate, 2-phenoxyethyl acrylate, acryloylmorpholine, 2-hydroxyethyl acrylate, 2-hydroxypropyl acrylate, 4-hydroxybutyl acrylate, isobutyl acrylate, t-butyl acrylate, isooctyl acrylate, isobornyl acrylate, cyclohexyl acrylate, 2-methoxyethyl acrylate, methoxytriethylene glycol acrylate, 2-ethoxyethylacrylate, tetrahydrofurfurylacrylate, 3-methoxybutyl acrylate, benzyl acrylate, ethoxyethoxyethyl acrylate, butoxyethyl acrylate, ethoxydiethylene glycol acrylate, methoxydipropylene glycol acrylate, methylphenoxyethyl acrylate, dipropylene glycol acrylate, β-carboxylethyl acrylate, phenoxydiethylene glycol acrylate, N-vinyl-2-caprolactam, vinylpyrrolidone, N-vinylformamide, ethyl diglycol acrylate, trimethylolpropane formal monoacrylate, 4-t-butylcyclohexyl acrylate, tri(meth)arylisocyanurate, imidoacrylate, isoamyl acrylate, ethoxylated succinic acrylate, caprolactone-modified tetrahydrofurfuryl acrylate, tribromophenyl acrylate, ethoxylated tribromophenyl acrylate, trifluoroethyl acrylate, ω-carboxypolycaprolactone monoacrylate and the like. These compounds may be used alone or in combination of two or more as needed.

In particular, polymerizable monomers dissolving the polymer dispersant are preferable. Examples of the polymerizable monomers include, but are not limited to, 2-phenoxyethyl acrylate, acryloylmorpholine, ethoxylated neopentylglycol di(meth)acrylate, propoxylated neopentylglycol di(meth)acrylate, tripropylene glycol di(meth)acrylate, ethoxylated trimethylolpropane triacrylate, propoxylated trimethylolpropane triacrylate, isobornyl acrylate, phenoxydiethylene glycol acrylate, N-vinyl-2-caprolactam, vinylpyrrolidone, N-vinylformamide, and 2-hydroxy-3-phenoxypropyl acrylate. Particularly favorable among them are 2-phenoxyethyl acrylate and N-vinyl-2-caprolactam.

2-Phenoxyethyl acrylate is preferably contained in the inkjet ink at a concentration of 30 to 90% by weight. An inkjet ink containing 2-phenoxyethyl acrylate at a concentration of 30% by weight or more is more superior in adhesiveness to the substrate. When the concentration thereof in the inkjet ink is 90% by weight or less, the coated film has a favorable Tg, and is rigid at room temperature. Alternatively, N-vinyl-2-caprolactam is preferably contained in the inkjet ink at a concentration of 5 to 30% by weight.

When the concentration of N-vinyl-2-caprolactam in the inkjet ink is 30% by weight or less, the inkjet ink is more stabilized in viscosity and superior in printing reproducibility when ejected, and allows ejection even after storage for an extended period of time. An inkjet ink containing N-vinyl-2-caprolactam at a concentration of 5% by weight or more is superior in adhesiveness to the substrate.

The inkjet ink according to the present invention may contain so-called oligomers or prepolymers, in addition to the monomers above. Specific examples thereof include, but are not limited to, "Ebecryl 1230, 244, 245, 270, 280/151B, 284, 285, 4830, 4835, 4858, 4883, 8402, 8803, 8800, 254, 264, 265, 294/35HD, 1259, 1264, 4866, 9260, 8210, 1290, 1290K, 5129, 2000, 2001, 2002 and 2100, KRM 7222, KRM 7735, 4842, 210, 215, 4827, 4849, 6700, 6700-20T, 204, 205, 6602, 220, 4450 and 770, IRR 567, 81, 84, 83, 80, 657, 800, 805, 808, 810, 812, 1657 and 1810, IRR 302, 450, 670, 830, 835, 870, 1830, 1870 and 2870, IRR 267 and 813, IRR 483, 811, 436, 438, 446, 505, 524, 525, 554W, 584, 586, 745, 767, 1701, 1755, 740/40TP, 600, 601, 604, 605, 607, 608, 609, 600/25TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703 and 3702, RDX 63182 and 6040, and IRR 419", manufactured by Daicel UCB; "CN104, CN120, CN124, CN136, CN151, CN2270, CN2271E, CN435, CN454, CN970, CN971, CN972, CN9782, CN981, CN9893, and CN991", manufactured by Sartomer Company; "Laromer EA81, LR8713, LR8765, LR8986, PE56F, PE44F, LR8800, PE46T, LR8907, PO43F, P077F, PE55F, LR8967, LR8981, LR8982, LR8992, LR9004, LR8956, LR8985, LR8987, UP35D, UA19T, LR9005, PO83F, PO33F, PO84F, PO94F, LR8863, LR8869, LR8889, LR8997, LR8996, LR9013, LR9019, PO9026V and PE9027V" manufactured by BASF; "Photomer3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572 and 3660", manufactured by Cognis; "Art Resin UN-9000HP, 9000PEP, 9200A, 7600, 5200, 1003, 1255, 3320HA, 3320HB, 3320HC, 3320HS, 901T, 1200TPK, 6060PTM, and 6060P", manufactured by Negami Chemical Industries; "Shikoh UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA and 2750B", manufactured by Nippon Synthetic Chemical Industry; "Kayarad R-280, R-146, R131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510 and UX-4101", manufactured by Nippon Kayaku; and the like.

When an ultraviolet ray is used as the active energy ray in the present invention, a photopolymerization initiator is added to the ink. A polymerization initiator of molecule cleavage or hydrogen abstraction type is favorable as the photopolymerization initiator. Specific examples thereof include, but are not limited to, benzoin isobutylether, 2,4-diethylthioxanthone, 2-isopropylthioxanthone, benzyl, 2,4,6-trimethylbenzoyldiphenylphosphine oxide, 2-benzyl-2-dimethylamino-1-(4-morpholinophenyl)-butan-1-one, bis(2,4,6-dimethoxybenzoyl)-2,4,4-trimethylpentylphosphine oxide, 2-methyl-[4-(methylthio)phenyl]-2-morpholinopropan-1-one, 2-hydroxy-1-[4-[4-(2-hydroxy-2-methyl-propionyl)-benzyl]phenyl]-2-methyl-propan-1-one, oligo(2-hydroxy-2-methyl-1-(4-(1-methylvinyl)phenyl)propanone), 1,2-octandione, 1-(4-(phenylthio)-2,2-(O-benzoyloxime)), and the like. An intermolecular cleavage-type initiator other than those above, such as 1-hydroxycyclohexylphenylketone, benzoin ethylether, benzyl dimethylketal, 2-hydroxy-2-methyl-1-phenylpropan-1-one, 1-(4-isopropylphenyl)-2-hydroxy-2-methylpropan-1-one or 2-methyl-1-(4-methylthiophenyl)-2-morpholinopropan-1-one, may be used in combination. In addition, a hydrogen abstraction-type photopolymerization initiator, such as benzophenone, 4-phenylbenzophenone, isophthalphenone or 4-benzoyl-4'-methyldiphenylsulfide, may also be used in combination. These photopolymerization initiators may be used alone or in combination of two or more as needed.

The photopolymerization initiator is preferably contained in an amount of 2 to 20% by weight with respect to the polymerizable monomer. If the initiator is contained in the ink in an amount of 2% by weight or more, the curing speed is high. If the initiator is contained in an amount of 20% by weight or less, the curing speed is not only high but also there is no residue in the mixture. Accordingly, there is no concern about the deterioration of inkjet ejection due to an increase in ink viscosity.

A surface adjuster is preferably added to the inkjet ink of to the present invention to improve the compatibility with the substrate. Examples of the surface adjusters include, but are not limited to, "BYK 300, 302, 306, 307, 310, 315, 320, 322, 323, 325, 330, 331, 333, 337, 340, 344, 348, 370, 375, 377, 350, 352, 354, 355, 356, 358N, 361N, 357, 390, 392, UV3500, UV3510 and UV3570" manufactured by BYK-Chemie; "Tegorad 2100, 2200, 2250, 2300, 2500, 2600 and 2700" manufactured by Tegochemie; and the like. These surface adjusters may be used alone or in combination of two or more as needed.

The surface adjuster is preferably contained in the ink at a concentration of 0.001 to 1% by weight.

A polymerization inhibitor, such as hydroquinone, p-methoxyphenol, t-butylcatechol, pyrogallol or butyl hydroxytoluene, is preferably added at a concentration of 0.01 to 5% by weight in ink to the inkjet ink according to the present invention, to improve ink stability over time and in-machine stability in the recording devices.

The active energy ray-curable inkjet ink according to the present invention may contain various other additives such as plasticizers, ultraviolet ray inhibitors, photostabilizers, and antioxidants.

The ink according to the present invention is printed on a printing medium by an inkjet ejecting device. The printing medium for use in the present invention is not particularly limited, and examples thereof include plastic media such as of polycarbonate, hard polyvinyl chloride, soft polyvinyl chloride, polystyrene, foamed polystyrene, PMMA, polypropylene, polyethylene, and PET, the mixtures or modified products thereof, metal media such as of glass and stainless steel, wood, and the like.

The ink according to the present invention can be used in a set of multiple inks containing different pigments, specifically in a set of 4, 5, 6 or 7 different kinds of inks. The set of four inks is, for example, a set of yellow, magenta, cyan and black or that of yellow, magenta, cyan and white.

The inkjet ink according to the present invention is prepared by dispersing a polymerizable monomer, a polymer dispersant and a pigment in a common dispersing machine such as a sand mill. Preferably, a concentrated pigment solution is prepared in advance and then diluted with a monomer. The mixture can be dispersed sufficiently even in a common dispersing machine. Because excessive dispersion energy or time is not required, it is not likely to cause any change in the ink components during dispersion, and an ink with superior stability can be obtained. The ink superior in stability thus formed is preferably filtered through a filter having a pore diameter of 3 µm or less, more preferably 1 µm or less.

The inkjet ink according to the present invention is preferably adjusted to a relatively higher viscosity of 5 to 50 mPa·s at 25° C. An ink having a viscosity of 5 to 50 mPa·s at 25° C. shows stabilized ejection characteristics, particularly when it is ejected through a normal inkjet printing head of 4 to 10 kHz and even at a higher frequency of 10 to 50 kHz.

An ink having a viscosity of 5 mPa·s or more is superior in repeated ejection efficiency from a high-frequency head and that of 50 mPa·s or less, is superior in ejection stability.

The inkjet ink according to the present invention is preferably an ink having an electric conductivity of 10 µS/cm or less in the piezoelectric head and being resistant to electrical corrosion in the head. In the case of a continuous-type ink, the electric conductivity thereof should be adjusted with electrolytes, and in such a case, it is adjusted to a value of 0.5 mS/cm or more.

When used, the inkjet ink according to the present invention is first supplied into a printer head of an ink-jet recording printer and ejected from the printer head onto a printing medium, and the resulting image is irradiated with an active energy ray such as ultraviolet ray or electron beam. Therefore, the composition on the printing medium is cured rapidly.

When an ultraviolet ray is irradiated, the active energy ray source for use is, for example, a high-pressure mercury lamp, a metal halide lamp, a low-pressure mercury lamp, an ultra-high-pressure mercury lamp, an ultraviolet laser, or sunlight. When electron beam is used for curing, an electron beam having an energy of 300 eV or less is usually used for curing, but irradiation at an intensity of 1 to 5 Mrad may be used for instantaneously curing.

EXAMPLES

Hereinafter, the present invention will be described specifically with reference to Examples, but it should be understood that the present invention is not particularly restricted by these Examples. The "parts" in Examples represents "parts by weight".

First, the composition of a pigment dispersion A is shown below. The pigment dispersion A was prepared by adding a polymer dispersant to a polymerizable monomer on stirring, and after complete dissolution of the polymer dispersant is confirmed, a pigment was added and the mixture was agitated for example with a high-speed mixer, and dispersing the resulting mill base in a horizontal sand mill for approximately 1 hour.

LIONOL BLUE FG-7400G (phthalocyanine pigment, manufactured by Toyo Ink Mfg.) 30 parts
  Solsperse 32000 (polymer dispersant, manufactured by Lubrizol) 9 parts
  Phenoxyethyl acrylate 61 parts The composition of a pigment dispersion B is shown below. The pigment dispersion B was prepared similarly to the dispersion A.

Special Black 350 (carbon black pigment, manufactured by Degussa) 30 parts
  Solsperse 32000 (polymer dispersant, manufactured by Lubrizol) 6 parts
  Phenoxyethyl acrylate 64 parts Example 1

The composition of an inkjet ink is shown below. The following components were agitated for 2 hours until no residue was confirmed, and the mixture was filtered through a membrane filter, for removal of bulky particles that is a cause of head clogging, to give an inkjet ink.

Pigment dispersion A 6.7 parts
  2-Phenoxyethyl acrylate 71.2 parts
  BYK-361N (acrylic resin manufactured by BYK Chemie) 0.1 part
  N-Acryloyloxyethyl hexahydrophthalimide 1.0 part
  N-Vinyl-2-caprolactam 4.3 parts
  Propoxylated neopentylglycol diacrylate 3.7 parts
  Esacure One (photopolymerization initiator, manufactured by Lambertie) 5.0 parts
  Lucirin TPO (photoradical polymerization initiator, manufactured by BASF) 5.0 parts
  Irgacure 819 (photopolymerization initiator, manufactured by Ciba Specialty Chemicals) 3.0 parts Example 2

The composition of an inkjet ink is shown below. The following blend was agitated for 2 hours until no residue was confirmed, and filtered through a membrane filter for removal of bulky particles that is a cause of head clogging, to give an inkjet ink.

Pigment dispersion A 6.7 parts
  2-Phenoxyethyl acrylate 22.2 parts
  BYK-361N (acrylic resin, manufactured by BYK Chemie) 0.1 part
  N-Acryloyloxyethyl hexahydrophthalimide 25.0 parts
  N-Vinyl-2-caprolactam 25.0 parts
  Ethoxylated hexanediol diacrylate 8.0 parts
  Irgacure 127 (photopolymerization initiator manufactured by Ciba Specialty Chemicals) 5.0 parts
  Lucirin TPO (photoradical polymerization initiator, manufactured by BASF) 5.0 parts
  Irgacure 819 (photopolymerization initiator, manufactured by Ciba Specialty Chemicals) 3.0 parts Example 3

The composition of an inkjet ink is shown below. The following blend was agitated for 2 hours until no residue was confirmed, and filtered through a membrane filter for removal of bulky particles that is a cause of head clogging, to give an inkjet ink.

Pigment dispersion B 9.4 parts
  2-Phenoxyethyl acrylate 35.2 parts
  BYK-331 (acrylic resin, manufactured by BYK Chemie) 0.1 part
  N-Acryloyloxyethyl hexahydrophthalimide 15.3 parts
  N-Vinyl-2-caprolactam 13.3 parts
  Ethoxylated bisphenol A diacrylate 3.7 parts
  Isobornyl acrylate 10.0 parts
  Esacure One (photopolymerization initiator, manufactured by Lambertie) 5.0 parts
  Lucirin TPO (photoradical polymerization initiator, manufactured by BASF) 5.0 parts Irgacure 819 (photopolymerization initiator, manufactured by Ciba Specialty Chemicals) 3.0 parts Example 4

The composition of an inkjet ink is shown below. The following blend was agitated for 2 hours until no residue was confirmed, and filtered through a membrane filter for removal of bulky particles that is a cause of head clogging, to give an inkjet ink.
Pigment dispersion A 6.7 parts
Isoboronyl acrylate 71.2 parts
BYK-361N (acrylic resin, manufactured by BYK Chemie) 0.1 part
N-Acryloyloxyethylhexahydrophthalimide 1.0 part
Isooctyl acrylate 4.3 parts
Propoxylated neopentylglycol diacrylate 3.7 parts
Esacure One (photopolymerization initiator, manufactured by Lambertie) 5.0 parts
Lucirin TPO (photoradical polymerization initiator, manufactured by BASF) 5.0 parts
Irgacure 819 (photopolymerization initiator, Ciba Specialty Chemicals) 3.0 parts Comparative Example 1

The composition of an inkjet ink is shown below. The following blend was agitated for 2 hours until no residue was confirmed, and filtered through a membrane filter for removal of bulky particles that is a cause of head clogging, to give an inkjet ink.
Pigment dispersion A 6.7 parts
2-Phenoxyethyl acrylate 71.2 parts
BYK-361N (acrylic resin, manufactured by BYK Chemie) 0.1 part
N-Vinyl-2-caprolactam 5.3 parts
Propoxylated neopentylglycol diacrylate 3.7 parts
Esacure One (photopolymerization initiator, manufactured by Lambertie) 5.0 parts
Lucirin TPO (photoradical polymerization initiator, manufactured by BASF) 5.0 parts
Irgacure 819 (photopolymerization initiator, manufactured by Ciba Specialty Chemicals) 3.0 parts Comparative Example 2

The composition of an inkjet ink is shown below. The following blend was agitated for 2 hours until no residue was confirmed, and filtered through a membrane filter for removal of bulky particles that is a cause of head clogging, to give an inkjet ink.
Pigment dispersion A 6.7 parts
2-Phenoxyethyl acrylate 12.2 parts
BYK-361N (acrylic resin, manufactured by BYK Chemie) 0.1 part
N-acryloyloxyethyl hexahydrophthalimide 40.0 parts
N-Vinyl-2-caprolactam 20.0 parts
Ethoxylated hexanediol diacrylate 8.0 parts
Irgacure 127 (photopolymerization initiator, manufactured by Ciba Specialty Chemicals) 5.0 parts
Lucirin TPO (photoradical polymerization initiator, manufactured by BASF) 5.0 parts
Irgacure 819 (photopolymerization initiator, manufactured by Ciba Specialty Chemicals) 3.0 parts Comparative Example 3

The composition of the inkjet ink is shown below. The following blend was agitated for 2 hours until no residue was confirmed, and filtered through a membrane filter for removal of bulky particles that is a cause of head clogging, to give an inkjet ink.
Pigment dispersion A 6.7 parts
2-Phenoxyethyl acrylate 12.2 parts
BYK-361N (acrylic resin, manufactured by BYK Chemie) 0.1 part
N-Acryloyloxyethyl hexahydrophthalimide 25.0 parts
N-Vinyl-2-caprolactam 40.0 parts
Ethoxylated hexanediol diacrylate 3.0 parts
Irgacure 127 (photopolymerization initiator, manufactured by Ciba Specialty Chemicals) 5.0 parts
Lucirin TPO (photoradical polymerization initiator, manufactured by BASF) 5.0 parts
Irgacure 819 (photopolymerization initiator, manufactured by Ciba Specialty Chemicals) 3.0 parts Each of the inkjet inks obtained in Examples 1 to 4 and Comparative Examples 1 to 3 were printed on a polycarbonate sheet by an inkjet printer equipped with a piezoelectric head, and the ejection stability, the adhesiveness, and the storage stability were evaluated.

Evaluation Methods (Ejection Stability)

The volume of the ink droplet was approximately 40 μl, and the drive frequency was controlled to 10 kHz so that the ink droplets were ejected at a resolution of 600×600 dpi (dpi: number of dots per 2.54 cm). The evaluation criteria are as follows. The satellite staining described below means tiny droplets formed behind the main droplet, which cause staining and image blurring, and thus, deterioration in printing quality when the satellite staining occurs on a printing medium.

○: No ejection failure during continuous ejection for 30 minutes

Δ: No nozzle clogging but satellite staining during continuous ejection for 30 minutes X: Nozzle clogging during continuous ejection for 30 minutes (Adhesiveness)

A cured film on a polycarbonate substrate is vertically and horizontally cut every 1 mm into 100 squares, and a cellolose tape was laminated onto the cut region. After rubbing the cellolose tape with an eraser for sufficient adhesion to the cured film, the cellolose tape was peeled off at an angle of 90°. The adhesiveness was evaluated by measuring the adhesion of the cured film to the substrate. The evaluation criteria are as follows:

○: No square film peeled off from squares.

Δ: 1 to 29 square films peeled off from 100 squares.

X: 30 to 100 square films peeled off from 100 squares.

(Storage Stability)

An ink was stored in an oven at 70° C. for 2 weeks, and the change in viscosity of the ink was determined. The evaluation criteria are as follows.

○: Difference in ink viscosity after storage for two weeks at 70° C.: less than 10%, based on the initial value Δ: Difference in ink viscosity after storage for two weeks at 70° C.: 10% to 40%, based on the initial value X: Difference in ink viscosity after storage for two weeks at 70° C.: 40% or more, based on the initial value

TABLE 1

|  | Example | | | | Comparative Example | | |
| --- | --- | --- | --- | --- | --- | --- | --- |
|  | 1 | 2 | 3 | 4 | 1 | 2 | 3 |
| Ejection stability | O | O | O | O | O | X | X |
| Adhesiveness | O | O | O | O | X | O | O |
| Storage stability | O | O | O | O | O | O | O |

As shown in the Table, the inks obtained in Examples 1 to 4 were not peeled from the polycarbonate sheet, which show they are superior in adhesiveness. The inks of Examples 1 to 4 also showed superior ejection stability and storage stability. In contrast, the ink obtained in Comparative Example 1 showed lower adhesiveness. Further, the printed medium was slightly tacky due to inefficient UV curing, thus, favorable printings could not be obtained. The ink of Comparative Example 2 was inferior in ejection stability, and due to its high viscosity, it could not be printed. The ink of Comparative Example 3 was inferior in ejection stability, thus, favorable printing could not be obtained.

What is claimed is:

1. An inkjet ink, comprising:
polymerizable monomers which comprise N-acryloyloxyethyl hexahydrophthalimide;
wherein
the inkjet ink is non-aqueous,
a content of the N-acryloyloxyethyl hexahydrophthalimide is from 1 to 30% by weight with respect to a total weight of the polymerizable monomers, and
a viscosity of the inkjet ink is from 5 to 50 mPa·s at 25° C.

2. The inkjet ink of claim 1, wherein the polymerizable monomers further comprise N-vinyl-2-caprolactam in an amount of from 5 to 30% by weight with respect to the total weight of the polymerizable monomers.

3. The inkjet ink of claim 1, which has an electrical conductivity of from 0.5 to 10 μS/cm.

4. The inkjet ink of claim 1, wherein the polymerizable monomers further comprise an acrylate monomer other than N-acryloyloxyethyl hexahydrophthalimide.

5. The inkjet ink of claim 1, further comprising a photopolymerization initiator.

6. The inkjet ink of claim 5, wherein an amount of the photopolymerization initiator is from 2 to 20% by weight with respect to the total weight of the ink.

7. The inkjet ink of claim 1, further comprising a colorant component selected from the group consisting of a dye, a pigment, and combinations thereof.

8. The inkjet ink of claim 7, wherein the colorant component comprises the pigment.

9. The inkjet ink of claim 1, wherein the polymerizable monomers further comprise 2-phenoxyethyl acrylate in an amount of from 30 to 90% by weight with respect to the total weight of the polymerizable monomers.

10. The inkjet ink of claim 9, further comprising a photopolymerization initiator.

11. The inkjet ink of claim 10, wherein an amount of the photopolymerization initiator is from 2 to 20% by weight with respect to the total weight of the ink.

12. The inkjet ink of claim 11, wherein the polymerizable monomers further comprise N-vinyl-2-caprolactam in an amount of from 5 to 30% by weight with respect to the total weight of the polymerizable monomers.

13. The inkjet ink of claim 12, further comprising a colorant component selected from the group consisting of a dye, a pigment, and combinations thereof.

14. The inkjet ink of claim 13, wherein the colorant component comprises the pigment.

15. The inkjet ink of claim 14, wherein the pigment is an organic pigment.

16. The inkjet ink of claim 14, wherein the pigment is an inorganic pigment.

17. The inkjet ink of claim 14, wherein the pigment comprises an organic pigment and an inorganic pigment.

18. A printing, which is obtained by a process comprising forming an image on a substrate with the inkjet ink of claim 1, and curing the inkjet ink of the image by irradiation with an active energy ray.

* * * * *